United States Patent [19]
Young et al.

[11] Patent Number: 5,660,652
[45] Date of Patent: Aug. 26, 1997

[54] TRUCK TIRE AND TREAD FOR STEER AXLES

[75] Inventors: Deborah Lynn Young; Austin Gale Young, both of Copley, Ohio

[73] Assignee: The Goodyear Tire & Rubber Company, Akron, Ohio

[21] Appl. No.: 502,444

[22] Filed: Jul. 14, 1995

[51] Int. Cl.$^6$ ............................... B60C 3/00; B60C 3/06
[52] U.S. Cl. ................... 152/209 R; 152/209 A; 152/454; 152/456
[58] Field of Search ............ 152/209 R, 209 D, 152/454, 209 A, 456

[56] References Cited

U.S. PATENT DOCUMENTS

| | | | |
|---|---|---|---|
| 3,012,599 | 12/1961 | Benson et al. | |
| 3,550,665 | 12/1970 | Verdier | 152/209 |
| 3,799,231 | 3/1974 | Boileau | 152/209 |
| 3,841,374 | 10/1974 | Boileau | |
| 3,954,130 | 5/1976 | Verdier | 152/209 R |
| 4,449,560 | 5/1984 | Tansei et al. | 152/209 R |
| 4,480,671 | 11/1984 | Giron | 152/209 R |
| 4,784,200 | 11/1988 | Fujiwara | 152/209 R |
| 4,785,861 | 11/1988 | Fujiwara | 152/209 R |
| 4,798,236 | 1/1989 | Fujiwara | 152/209 R |
| 4,995,437 | 2/1991 | Enoki et al. | 152/209 R |
| 5,522,442 | 6/1996 | Kishi | 152/209 R |

FOREIGN PATENT DOCUMENTS

| | | | |
|---|---|---|---|
| 1319600 | 6/1993 | Canada | 152/209 R |
| 0659594 | 12/1994 | European Pat. Off. | |
| 2343747 | 3/1975 | Germany | 152/209 R |
| 155104 | 7/1987 | Japan | 152/209 R |
| 295702 | 12/1987 | Japan | 152/454 |
| 81704 | 3/1990 | Japan | 152/454 |
| 43103 | 2/1992 | Japan | 152/209 R |
| 77608 | 3/1993 | Japan | 152/209 R |
| 1254699 | 11/1971 | United Kingdom | |
| 1273133 | 5/1972 | United Kingdom | |
| 1546593 | 5/1979 | United Kingdom | 152/209 R |

OTHER PUBLICATIONS

1970 Tread Design Guide, p. 9.
Smithers Laboratories, Akron, Ohio, May 1969 Tire Service.

*Primary Examiner*—Steven D. Maki
*Attorney, Agent, or Firm*—David L. King

[57] ABSTRACT

A new pneumatic radial ply truck tire 10 for use on steering axles is disclosed. The tire 10 has a 20 tread having a plurality of circumferentially continuous grooves 22, a pair of narrow circumferential decoupling grooves 24, a pair of radially recessed ribs 21, and a plurality of tread ribs 25,25A. The tread 20 has a radially outer tread surface 30 having a curvature defined by an internal radius of curvature $R_i$ and an external radius of curvature $R_e$, $R_e$ extending laterally over a majority of a shoulder rib 25A to the narrow decoupling groove 24 on at least one-half of the tread 20, preferably both tread halves. The shoulder rib 25A has a thickness (t) at the circumferential groove 22 which progressively increases to a thickness (t max) adjacent the narrow decoupling groove 24. The tread 20 exhibits a pressure distribution in the shoulder region which is complimentary to uniform wear.

5 Claims, 7 Drawing Sheets

TRUCK TIRE AND TREAD FOR STEER AXLES

BACKGROUND

The present invention relates to truck tire treads and tires for steer axles.

The use of treads specifically designed for the steer axle of truck tires has been directed to various forms of rib-type tires. This nondriving axle exhibits cornering and turning loads as well as straight line running loads. Some skilled in the art believe the tread ribs should ideally have a sharp edge adjacent circumferential grooves to provide improved handling.

Figure 2:
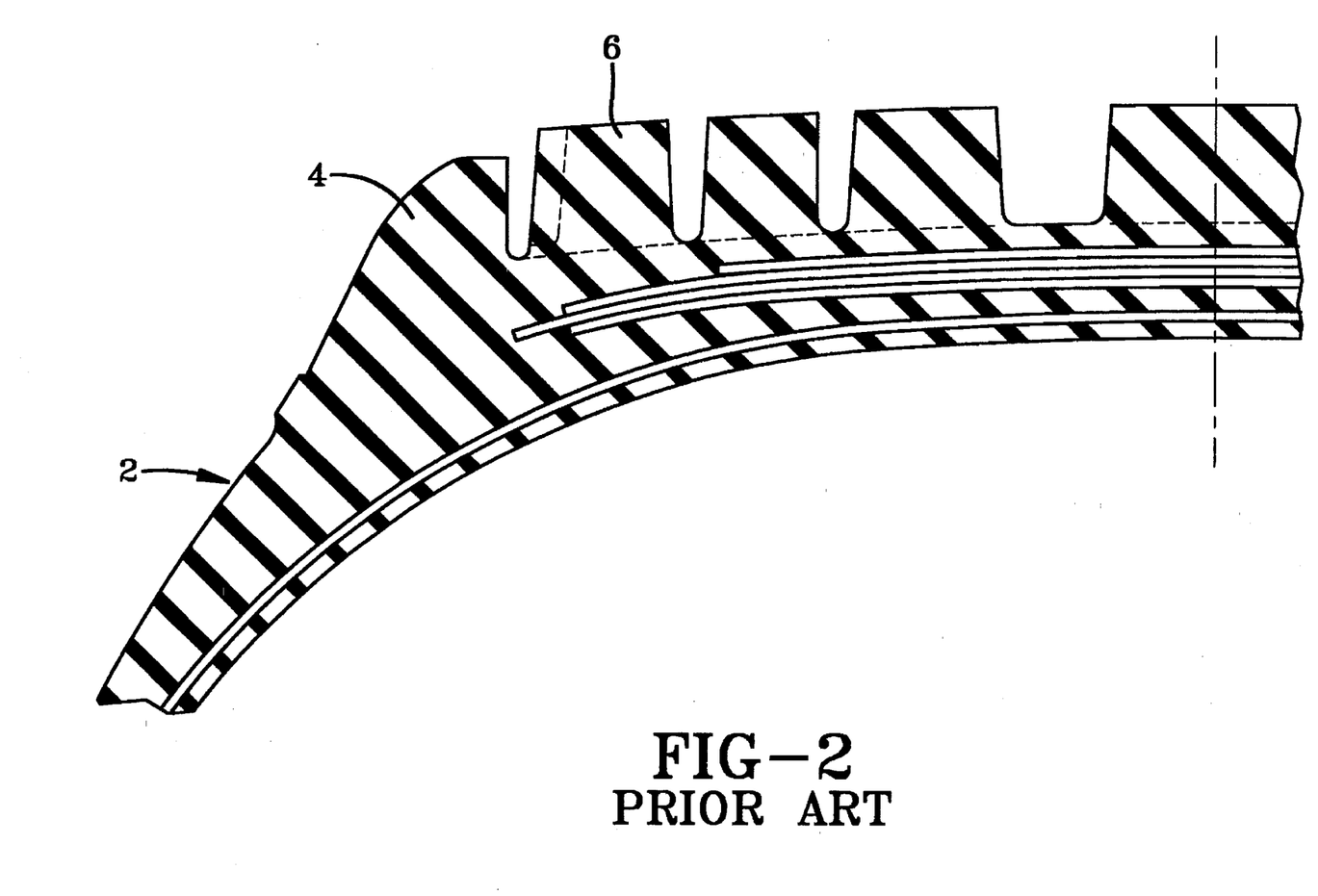
FIG. 2 is a partial cross-sectional view of a prior art tire disclosed in U.S. Pat. No. 4,480,671.

These sharp edges during normal use can exhibit irregular tread wear. High wear erosion is common in the shoulder region of the tread. This problem was addressed in U.S. Pat. No. 4,480,671 issued Nov. 6, 1984, to Giron. He disclosed the use of a laterally located circumferentially continuous rib 4 that under normal driving conditions is in contact with the road, the force or pressure exerted by the rib 4 on the road being less than the force or pressure of the shoulder rib 6. This prior art tire 2 relied on the laterally located rib to protect the sharp edge of the shoulder rib. This slightly recessed laterally located rib 4 as shown in FIG. 2 was claimed to be in contact with the road surfaces when in normal running conditions, the laterally located rib 4 exhibiting less pressure than shoulder rib 6. One such tire 2 is believed to be the Michelin XZA-1+ steer tire.

Figure 3:
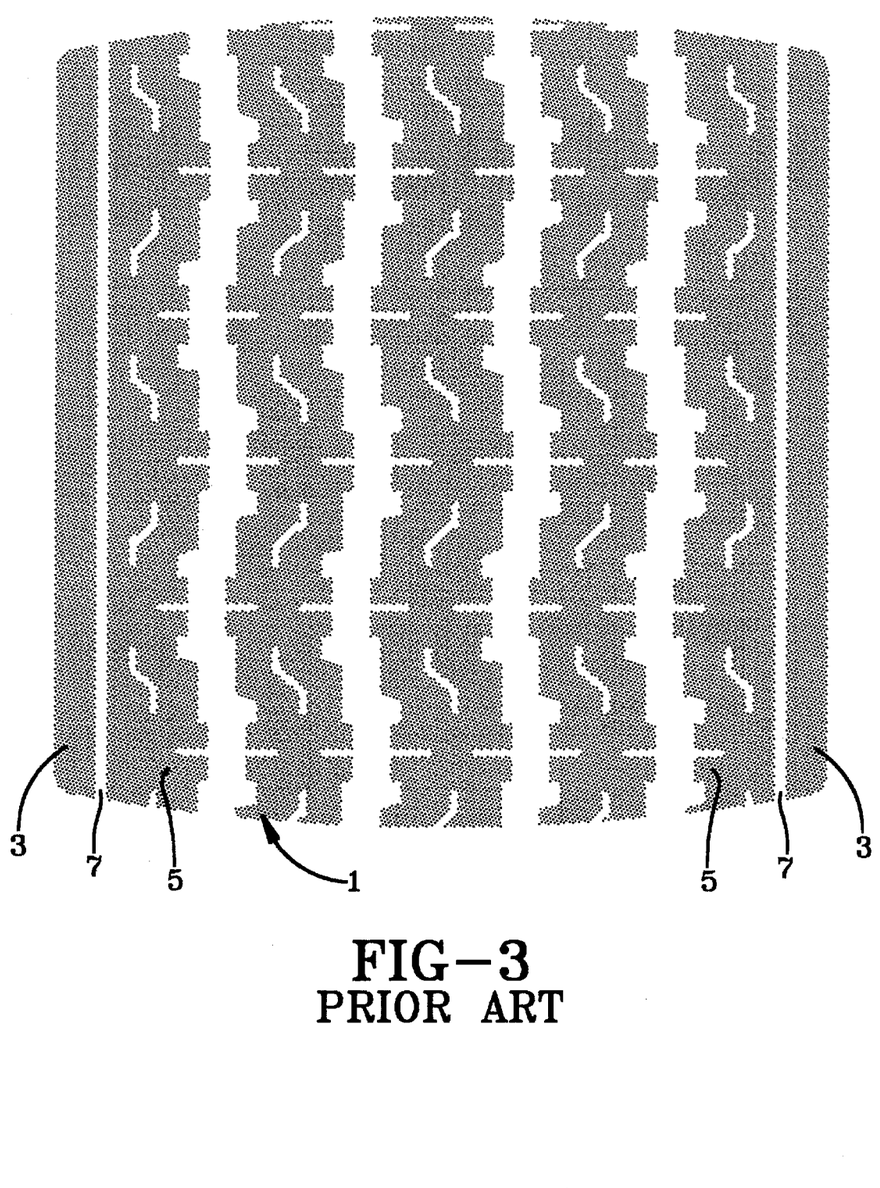
FIG. 3 is an exemplary footprint of a prior art tire commercially sold as the Goodyear G259.

An alternative design approach was to have a nonrecessed circumferential rib 3 adjacent a narrow circumferentially continuous groove 7 and shoulder rib 5. Such a tire was commercially sold as the Goodyear G259 steer tire and that tire 1 exhibits a static footprint or tread contact patch as shown in FIG. 3.

Although both of the above-mentioned prior art tire are commercially successful providing tires capable of surviving in excess of 100,000 miles on the original tread, a new and potentially superior solution to irregular tread wear problems has been discovered and is described below.

SUMMARY OF THE INVENTION

A new pneumatic radial ply truck tire 10 for use on the steering axles is described. The tire 10 has a tread 20 and a casing 12. The casing 12 has two sidewalls 14,16, one or more radial plies 18 extending from and wrapped about two annular beads 13 and a belt reinforcement structure 15 located radially between the tread 20 and the casing plies 18.

The tread 20 has a plurality of circumferentially continuous grooves 22, a pair of radially recessed ribs 21 and a pair of narrow circumferential decoupling grooves 24, and a plurality of tread ribs 25,25A.

The radially recessed ribs 21 of the tire 10 as molded are non-road contacting under static load and are designed to be non-road contacting under normal driving conditions. One of the narrow circumferential decoupling grooves 24 is adjacent each recessed rib 21.

The plurality of tread ribs 25 include a pair of shoulder ribs 25A, one shoulder rib 25A being adjacent each narrow circumferential decoupling groove 24. The ribs 25,25A each have a radially outer road contacting surface 26, the radially outer road contacting surfaces 26 define the radially outer tread surface 30. The outer tread surface 30 is adjacent to and extends between the pair of narrow circumferential decoupling grooves 24. The distance halfway between the narrow decoupling grooves 24 define the centerline $C_L$ of the tread 20.

2

In a cross-section of the tread 20, the radially outer tread surface 30 has a maximum diameter D at the tread centerline $C_L$ and a constant internal radius of curvature Ri extending laterally toward each narrow circumferential decoupling groove 24, preferably the constant internal radius of curvature Ri being less than the maximum diameter D and originating on the centerline $C_L$ of the tread 20. At a point 40 located on at least one-half of the tread 20, the curvature of the radially outer tread surface 30 changes wherein the tread surface 30 has a radius of curvature Re originating external to the tire 10. The external radius of curvature Re is at least greater than D and extends laterally over a majority of the shoulder rib 25A to the adjacent narrow decoupling groove 24 which increases the radial thickness (t) of the shoulder rib 25A progressively from the point 40 of curvature change or adjacent the circumferential groove 22 to a maximum radial thickness (t max), (t max) being adjacent the narrow decoupling groove 24 preferably the difference in radial thickness (t max −t) at location $P_3$ is in the range 0.04 inches (1.0 mm) to 0.07 inches (1.8 mm).

The tread 20 exhibits a unique pressure distribution in a static footprint of the tire 10. When the tire 10 is normally inflated and normally loaded, the pressure exerted at the shoulder rib 25A adjacent the narrow decoupling groove 24 is $P_3$ along the circumferential center 50 of the footprint. On the shoulder rib 25A adjacent the continuous groove 22 is $P_1$. The pressure of the rib 25 laterally adjacent the shoulder rib 25A at the wide groove 22 is $P_2$. The resulting pressure distribution is $P_1$ about equals $P_2$ and $P_3$ is greater than $P_1$ but less than 400% $P_1$.

The above described tire 10 as disclosed can exhibit exceptionally uniform wear, maintaining the sharp edge of the shoulder rib without creating other nonuniformwear problems. In other words, the reverse curvature in the shoulder region helped to inhibit shoulder cupping or scalloping of the tread shoulder rib.

DEFINITIONS

"Apex" means an elastomeric filler located radially above the bead core and between the plies and the turnup ply.

"Bead" means that part of the tire comprising an annular tensile member wrapped by ply cords and shaped, with or without other reinforcement elements such as flippers, chippers, apexes, toe guards and chafers, to fit the design rim.

"Belt Structure" means at least two annular layers or plies of parallel cords, woven or unwoven, underlying the tread, unanchored to the bead, and having both left and right cord angles in the range from 15° to 68° with respect to the circumferential centerline of the tire.

"Casing" means the carcass, belt structure, beads, sidewalls, and all other components of the tire excepting the tread and undertread. The casing may be new, unvulcanized rubber or previously vulcanized rubber to be fitted with a new tread.

"Chafers" refers to narrow strips of material placed around the outside of the bead to protect cord plies from the rim, distribute flexing above the rim, and to seal the tire.

"Circumferential" means lines or directions extending along the perimeter of the surface of the annular tread perpendicular to the axial direction.

"Cord" means one of the reinforcement strands of which the belts and plies in the tire are comprised.

"Lateral" means an axial direction.

"Ply" means a continuous layer of elastomeric rubber-coated parallel cords.

"Radial" and "radially" mean directions radially toward or away from the axis of rotation of the tire.

"Radial Ply Tire" means a belted or circumferentially-restricted pneumatic tire in which the ply cords which extend from bead to bead are laid at cord angles between 65° and 90° with respect to the equatorial plane of the tire.

"Shoulder" means the upper portion of sidewall just below the tread edge; tread shoulder or shoulder rib means that portion of the tread near the shoulder.

"Sidewall" means that portion of a tire between the tread and the bead.

"Tread" means a rubber or elastomeric component including that portion of the tire that comes into contact with the road under normal inflation and load.

DETAILED DESCRIPTION OF THE PREFERRED EMBODIMENT

Figure 1:
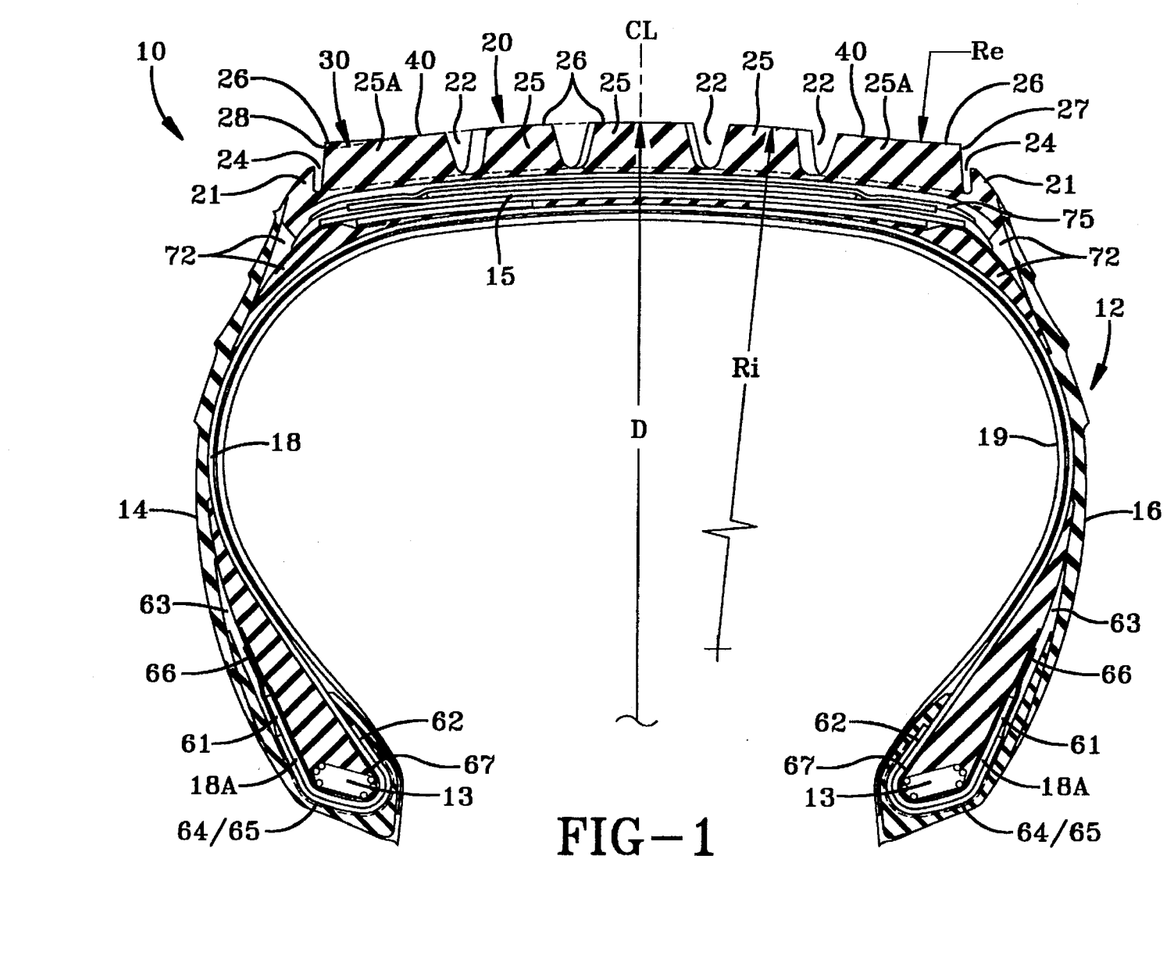
FIG. 1 is a cross-sectional view of the tire 10 according to the present invention.

With reference to FIG. 1, a cross section of the pneumatic radial tire 10 for use on steering axles is illustrated.

The tire 10 has a tread 20 and a casing 12. The casing 12 has two sidewalls 14,16 one or more radial plies 18 extending from and wrapped about two annular beads 13 and a belt reinforcement structure 15 located radially between the tread 20 and the plies 18.

The plies 18 and the belt reinforcement structure 15 are cord reinforced elastomeric material, the cords being preferably steel wire filaments and the elastomer preferably being a vulcanized rubber material. Similarly, the annular beads 13 have steel wires wrapped into a bundle known as the bead core.

A liner 19 component of preferably halobutyl rubber forms a somewhat air impervious chamber to contain the air pressure when the tire 10 is inflated.

The casing 12 of the preferred embodiment of the invention, as illustrated in FIG. 1, employed a bead 13 having an 8×10×9 hexagonal bead core having an elastomeric apex 61 radially above the bead 13. The ply turnup 18A in the bead area was reinforced with a flipper 67, chipper 62, gum and fabric chafers 64,65, gum strips 66 and elastomeric wedges 63.

Additionally, the belt reinforcement structure 15 included gum strip of rubber material 75 and a plurality of elastomeric strips or wedges 72 in the lateral extremes of the belts 15 in proximity of the decoupling groove 24. Although not required to the practice of the inventive concept, the these features are disclosed as features employed in the preferred embodiment.

Figure 6:
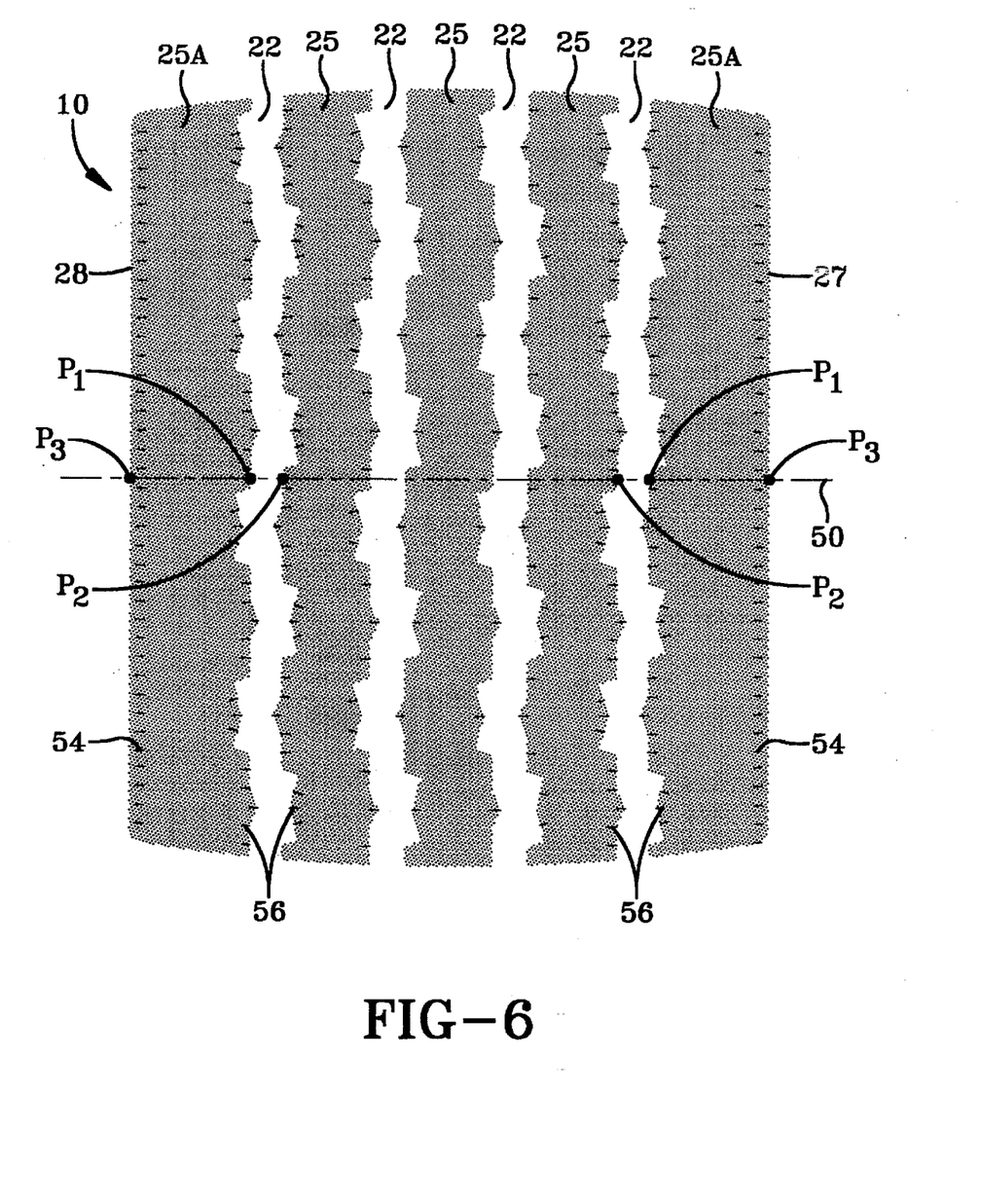
FIG. 6 is an exemplary tire footprint of the present invention depicting the pressure distribution of the tire as molded.

The tread 20 has a plurality of circumferentially continuous grooves 22, a pair of radially recessed ribs 21 located at the lateral extremes of the tread, a pair of narrow circumferential decoupling grooves 24, and a plurality of tread ribs 25, including a pair of shoulder ribs 25A, one shoulder rib 25A being adjacent each narrow circumferential decoupling groove 24. A plurality of sipes or blades 54 and 56 are preferably employed on the tread 20 as shown in FIG. 6.

As shown in FIG. 1, one circumferential decoupling groove 24 is adjacent each recessed rib 21. The radially recessed ribs 21 are non-road contacting under static load as well as under normal driving conditions.

The distance halfway between the narrow decoupling grooves 24 defines the centerline $C_L$ of the tread 20.

The radially outer road contacting surfaces 26 of the plurality of tread ribs 25 define a radially outer tread surface 30. The outer tread surface 30 is adjacent to and extends between the pair of narrow circumferential decoupling grooves 24.

The radially outer tread surface 30 has a maximum diameter D at the tread centerline $C_L$ and a constant internal radius of curvature Ri extending laterally toward each narrow circumferential decoupling groove 24. The constant internal radius of curvature is preferably less than the maximum diameter D and originates on the centerline $C_L$ of the tread 20.

As shown in FIG. 1 at a point 40 located on at least one-half of the tread 20, the curvature of the radially outer tread surface 30 changes wherein the tread surface 30 has a radius of curvature Re originating external to the tire 10. The external radius of curvature Re is at least greater than D and extends laterally over a majority of the shoulder rib 25A to the adjacent narrow decoupling groove 24. The shoulder rib 25A increases progressively from a radial thickness (t) at the adjacent circumferential groove 22 or the point 40 of curvature change to a maximum radial thickness (t max), (t max) being adjacent the narrow decoupling groove 24. If the curvature change occurs asymmetrically on one-half of the tread it is believed to be most beneficial on the outboard side of the tread 20. In the preferred embodiment the curvature change is employed on both tread halves, as shown in FIG. 1. This results in two points 40 of curvature change.

As shown in FIG. 6, the tread 20 when new exhibits a pressure distribution in a static footprint of the tire, when the tire is normally loaded such that the pressure exerted at the circumferential center 50 of the footprint on the shoulder rib 25A adjacent the narrow decoupling groove 24 is $P_3$, on the shoulder rib 25A adjacent the circumferential groove 22 is $P_1$, on the rib 25 laterally adjacent the shoulder rib 25A at the groove 22 is $P_2$. The relationship of the pressure distribution is $P_1$ is about equal to $P_2$ and $P_3$ is greater than $P_1$ but less than 400% $P_1$, preferably about 200%.

Figure 4:
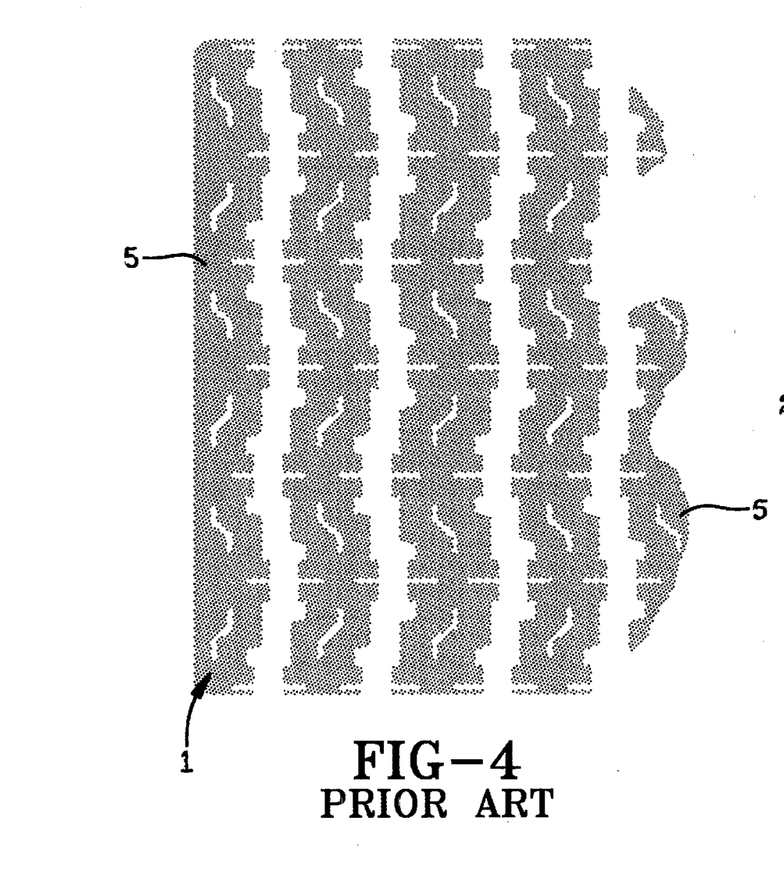
FIG. 4 is an illustration of a prior art exemplary G259 tire footprint exhibiting shoulder rib cupping after 100,000 miles of use.
Figure 5:
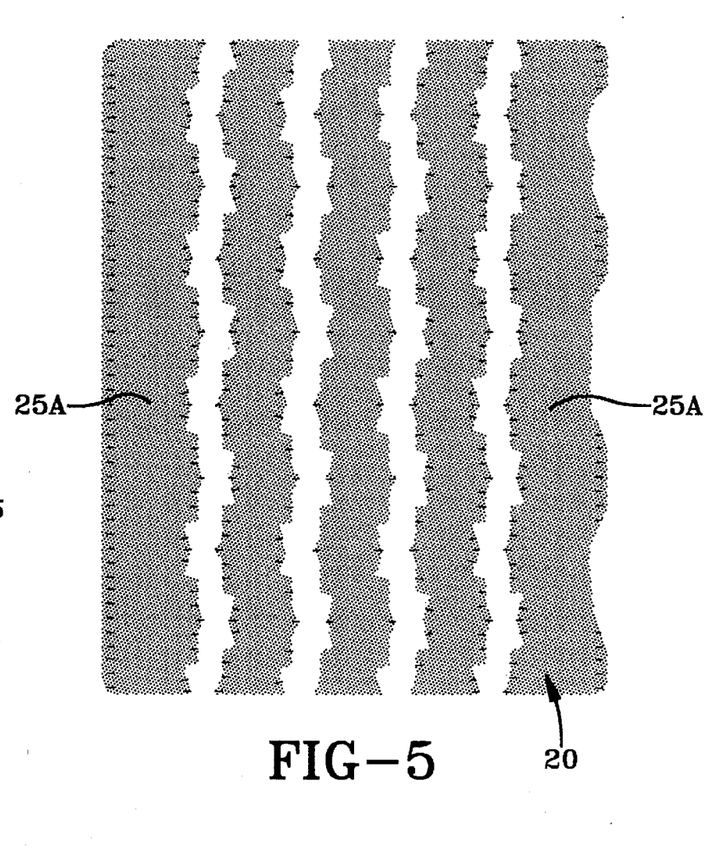
FIG. 5 is an exemplary tire footprint of the present invention after 100,000 miles of use.

As shown in FIG. 4, a prior art tire 1, the G259 after 100,000 miles of wear exhibits considerable cupping wear in the shoulder rib region 5. The decoupling Or recessed lateral rib 3 is noticeably worn away from road contact at this wear condition. While the tire 10 according to the preferred embodiment of the invention as illustrated in FIG. 1, has a much more uniform wear in the same shoulder regions of the tread 20 as depicted in FIG. 5. Both the prior art tire 1 and the test tires 10 were of similar size, 295/75R22.5 and 11R22.5, and similarly loaded and inflated during the evaluations.

The above-described pressure distribution exhibited by tire 10 is achieved by effectively progressively increasing the thickness of the tread 20 from the point 40 of the change in curvature to the decoupling groove 24. This added rubber effectively provides more material in an area of high wear propensity and increases the pressure in the area adjacent the decoupling groove improving the maintenance of the sharp edge 27 of the shoulder rib 25A.

Figure 4A:
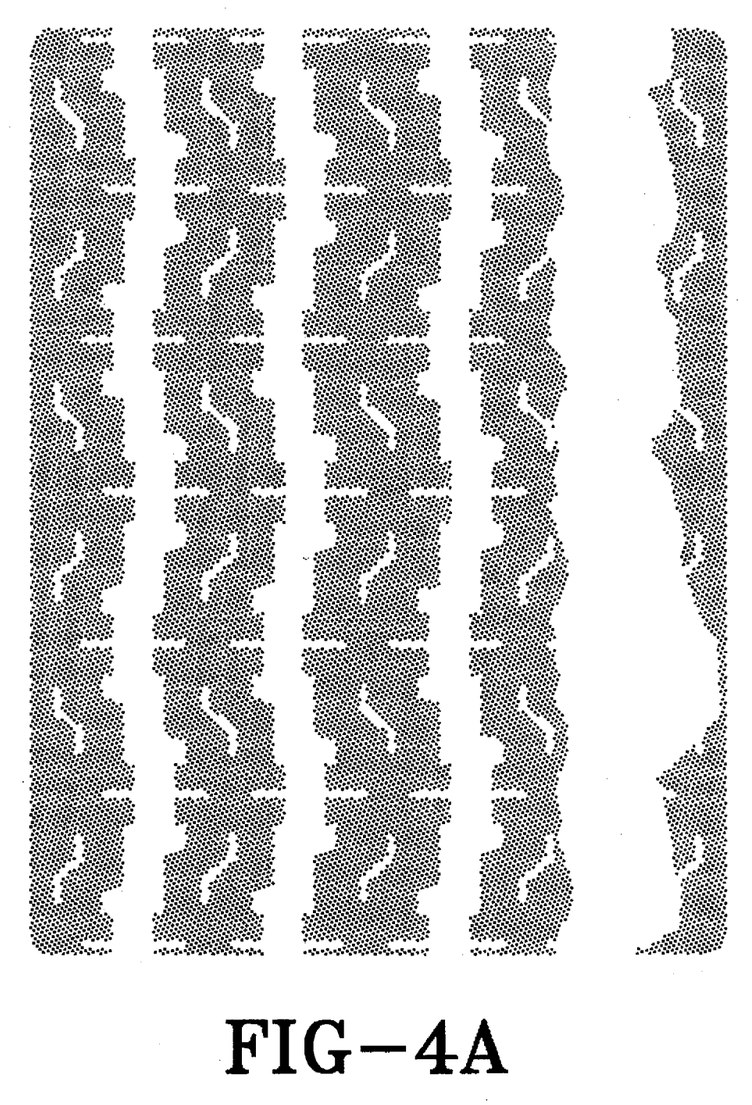
FIG. 4A is an exemplary experimental tire footprint after 100,000 miles of wear having an external radius of curvature Re less than D.

Interestingly an upper limit in the amount of pressure change must be maintained wherein $P_3$ should not exceed 400% $P_1$. If too much rubber is added to the shoulder rib adjacent the decoupling groove the area adjacent the groove 22 can become lightly loaded. When this condition occurs a phenomena known as erosion wear or river wear can occur adjacent the groove 22 as shown in FIG. 4A. To prevent this problem from occurring a balance must be maintained. Ideally, both edges across the shoulder ribs 25A wear at the same uniform rate. This condition achieves a most beneficial projected mileage life of the tread.

Figure 7:
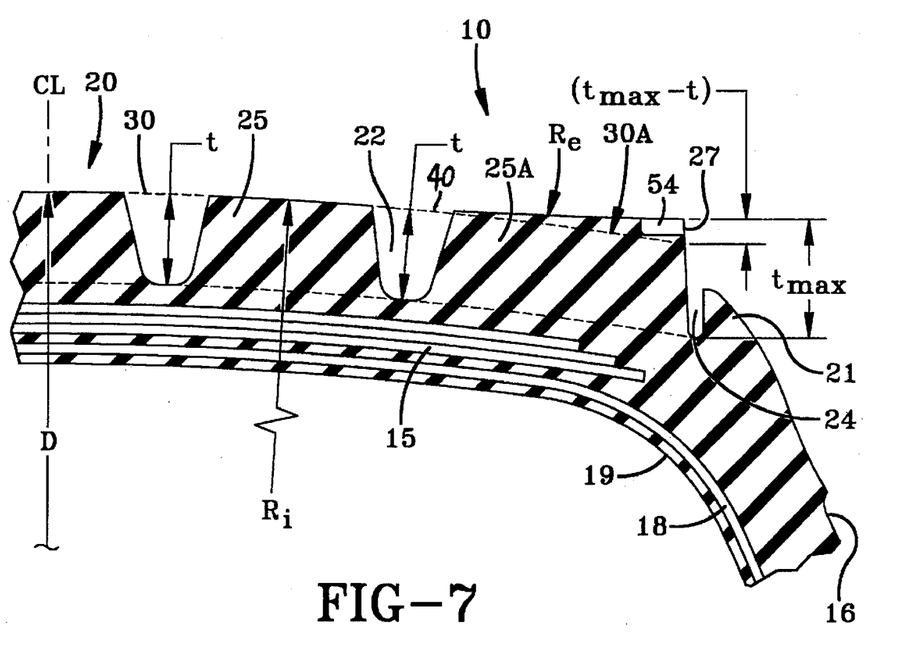
FIG. 7 is a cross-section of one-half of an experimental tire of an early prototype.
Figure 8:
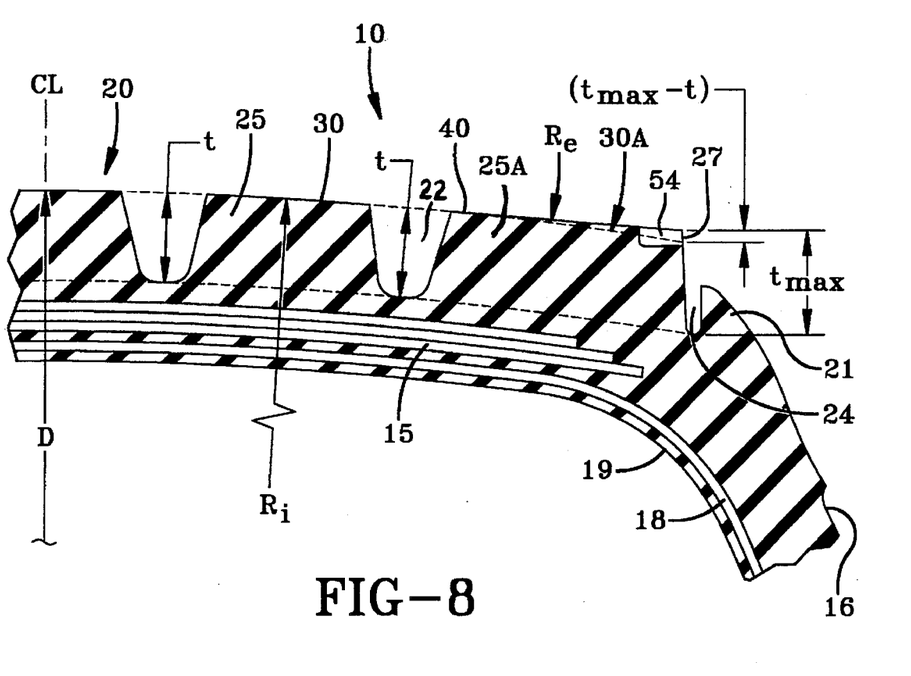
FIG. 8 is a cross-section of one-half of the tire of the preferred tire according to the invention.

To facilitate an understanding of the progression change in thickness, the region of the radially outer tread surface 30 defined by the radius of curvature Ri has been extended as shown by the dashed line 30A on FIGS. 7 and 8. The difference between the curvature defined by Ri and the actual outer tread surface 30 define by the curvature Re in the shoulder region can thus be easily appreciated as shown.

As shown in FIG. 7, the thickness of the shoulder rib 25A was increased from a radial thickness (t) of about 0.58 inches to a radial thickness (t max) of about 0.65 inches yielding an increase of about 0.07 inches. The external radius of curvature Re was set at 35 inches. In this configuration improved shoulder wear at edge 27,28 was confirmed, however, noticeable erosion wear problem was observed adjacent groove 22.

As illustrated in FIG. 8, by changing the Re radius to 999 inches the increase in (t max) relative to (t) was reduced to 0.04 inches. This small adjustment permits the tread 20 to wear most uniformly at both edges of the shoulder rib 25A. As can be seen from the foregoing, a small change in the shape of the tread curvature as molded can lead to major benefits in improved wear rates.

What is claimed is:

1. A pneumatic radial ply track tire for use on steering axles, comprising a tread, a casing, the casing having two sidewalls, one or more radial plies extending from and wrapped about two annular beads and a belt reinforcement structure located radially between the tread and the plies, the tread characterized by:

a plurality of circumferentially continuous grooves;

a pair of radially recessed ribs, the radially recessed ribs being radially recessed and non-road contacting under static load;

a pair of narrow circumferential decoupling grooves, one circumferential decoupling groove being adjacent each recessed rib; and a plurality of tread ribs, including a pair of shoulder ribs, one shoulder rib being adjacent each narrow circumferential decoupling groove, the radially outer surfaces of the plurality of tread ribs defining a radially outer tread surface, the outer tread surface being adjacent to and extending between the pair of narrow circumferential decoupling grooves, the distance halfway between the narrow decoupling grooves defining the centerline of the tread, in a cross section of the tread, the radially outer tread surface has a maximum diameter D at the tread centerline and a constant internal radius of curvature Ri extending laterally toward each narrow circumferential decoupling groove, the constant internal radius of curvature originating on the centerline of the tread, at a point located on at least one-half of the tread, the curvature of the radially outer tread surface changes wherein the tread surface has a radius of curvature Re originating external to the tire, the external radius of curvature Re being at least greater than D and extending laterally over a majority of the shoulder rib to the adjacent narrow decoupling groove increasing the radial thickness (t) of the shoulder rib progressively from the point of curvature change to a maximum radial thickness (t max), the maximum radial thickness (t max) being adjacent the narrow decoupling groove, the tread exhibiting a pressure distribution in a static footprint of the tire, when the tire is normally inflated and normally loaded such that the pressure exerted at the circumferential center of the footprint at the shoulder rib adjacent the narrow decoupling groove is $P_3$, on the shoulder rib adjacent the continuous groove is $P_1$, the pressure on the rib laterally adjacent the shoulder rib at the groove being $P_2$ wherein $P_1$ about equals $P_2$ and $P_3$ is greater than $P_1$ by at least about 200% but less than 400% $P_1$.

2. The pneumatic tire of claim 1 wherein the tread curvature Ri changes to Re at two locations, one on each half of the tread.

3. The pneumatic tire of claim 1 wherein the constant internal radius of curvature Ri is less than the maximum diameter D.

4. The pneumatic tire of claim 3 wherein the external radius of curvature Re is about 999 inches.

5. The pneumatic tire of claim 1 wherein the difference of the maximum radial thickness (t max) minus the radial thickness (t) at location $P_3$ is in the range of 0.04 inches (1.0 mm) to 0.07 inches (1.8 mm).

* * * * *